(12) United States Patent
Westrick et al.

(10) Patent No.: US 8,461,992 B2
(45) Date of Patent: Jun. 11, 2013

(54) RFID COUPLER FOR METALLIC IMPLEMENTS

(75) Inventors: Michael D. Westrick, Fort Wayne, IN (US); Daniel L. Sands, Warsaw, IN (US)

(73) Assignee: Solstice Medical, LLC, Fort Wayne, IN (US)

( * ) Notice: Subject to any disclaimer, the term of this patent is extended or adjusted under 35 U.S.C. 154(b) by 363 days.

(21) Appl. No.: 11/747,617

(22) Filed: May 11, 2007

(65) Prior Publication Data

US 2007/0262867 A1 Nov. 15, 2007

Related U.S. Application Data

(60) Provisional application No. 60/800,090, filed on May 12, 2006.

(51) Int. Cl.
*G08B 13/14* (2006.01)
*H01Q 21/00* (2006.01)
*H01Q 1/48* (2006.01)
*H01Q 9/16* (2006.01)
*H01Q 1/32* (2006.01)

(52) U.S. Cl.
USPC .............. 340/572.1; 340/572.7; 340/572.8; 343/816; 343/865; 343/847; 343/713

(58) Field of Classification Search
USPC ............. 340/572.1, 572.7, 540; 343/700
See application file for complete search history.

(56) References Cited

U.S. PATENT DOCUMENTS

| | | | |
|---|---|---|---|
| 5,243,223 A * | 9/1993 | Yamada et al. | 257/789 |
| 6,072,383 A | 6/2000 | Gallagher, III | |
| 6,107,920 A * | 8/2000 | Eberhardt et al. | 340/572.7 |
| 6,130,512 A * | 10/2000 | Manos et al. | 315/248 |
| 6,184,841 B1 | 2/2001 | Shober | |
| 6,208,235 B1 | 3/2001 | Trontelj | |
| 6,445,297 B1 | 9/2002 | Nicholson | |
| 6,446,208 B1 * | 9/2002 | Gujar et al. | 713/185 |
| 6,486,783 B1 | 11/2002 | Hausladen | |
| 6,563,425 B2 | 5/2003 | Nicholson | |
| 6,696,954 B2 | 2/2004 | Chung | |
| 6,720,930 B2 | 4/2004 | Johnson | |
| 6,914,562 B2 | 7/2005 | Forster | |
| 6,943,688 B2 * | 9/2005 | Chung et al. | 340/572.7 |
| 6,963,317 B2 | 11/2005 | Zuk | |
| 7,017,822 B2 | 3/2006 | Aisenbrey | |
| 7,019,651 B2 | 3/2006 | Hall | |
| 7,118,029 B2 | 10/2006 | Nyez | |
| 7,557,757 B2 * | 7/2009 | Deavours et al. | 343/700 MS |
| 7,696,947 B2 * | 4/2010 | Gallschuetz et al. | 343/860 |
| 7,911,404 B2 | 3/2011 | Yamagajo et al. | |
| 2004/0031618 A1* | 2/2004 | Czjakowski et al. | 174/35 R |
| 2006/0057536 A1* | 3/2006 | Tamburrino et al. | 433/30 |
| 2006/0119231 A1* | 6/2006 | Suzuki et al. | 310/365 |

(Continued)

FOREIGN PATENT DOCUMENTS

EP 1 630 730 A1 3/2006

*Primary Examiner* — Jennifer Mehmood
*Assistant Examiner* — Pameshanand Mahase
(74) *Attorney, Agent, or Firm* — Taylor IP, P.C.

(57) ABSTRACT

An RFID tagged implement assembly includes a metallic implement, and a wireless RFID transponder. The RFID transponder includes a housing; an inductive coupler within the housing, and an RFID chip coupled with the inductive coupler. The inductive coupler is inductively coupled with the metallic implement.

21 Claims, 4 Drawing Sheets

U.S. PATENT DOCUMENTS

| | | | |
|---|---|---|---|
| 2006/0152364 A1* | 7/2006 | Walton | 340/568.1 |
| 2007/0139202 A1 | 6/2007 | Austin | |
| 2007/0252706 A1* | 11/2007 | Furutani | 340/572.8 |
| 2007/0262866 A1* | 11/2007 | Eveland | 340/572.7 |
| 2008/0048863 A1* | 2/2008 | Copeland | 340/572.1 |
| 2008/0122629 A1* | 5/2008 | Yamagajo et al. | 340/572.7 |
| 2008/0150726 A1 | 6/2008 | Yamagajo et al. | |
| 2008/0211629 A1* | 9/2008 | Evans et al. | 340/10.1 |

* cited by examiner

RFID COUPLER FOR METALLIC IMPLEMENTS

CROSS REFERENCE TO RELATED APPLICATIONS

This is a non-provisional application based upon U.S. provisional patent application Ser. No. 60/800,090, entitled "RF TUNED IMPLANTABLE DEVICE/SURGICAL TOOL TRANSPONDER", filed May 12, 2006.

BACKGROUND OF THE INVENTION

1. Field of the Invention

The present invention relates to a passive wireless transponder.

2. Description of the Related Art

Radio frequency identification (RFID) tags are well known throughout industry, and are being increasingly utilized for supply chain management, inventory management, and logistic control. These tags can be written to and read from a handheld transceiver (referred to as an RFID reader) or fixed portal.

Small glass encapsulated low frequency RFID tags (see FIG. 1) are currently being utilized in surgical tools and implantable devices. These small "capsules" contain their own "onboard" antenna, which suffer extreme radio frequency degradation due to interference created by the proximity of the metals or liquids utilized in surgical tools implantable devices and surgical processes. As a result of this proximity, virtual contact (actual physical contact or less than ⅛ inch) must be made between the reader antenna and the surgical tool or implantable device in order to read or write to the RFID tag. This "virtual" contact requirement makes communication with a surgically implanted device impossible because of the distance associated with intervening soft tissues between the RFID reader and the implanted RFID tag.

Similarly, small RFID tags embedded or attached to surgical tools and implants may frequently be contained in a metal enclosure with small holes designed to allow the tools or implants to be sterilized using a high heat autoclave process. The metal enclosure prohibits the RFID tags located on or in the tools and implants to be read inside the enclosure. In order to read the tags inside the enclosure, the lid must be opened and virtual contact (actual physical contact or less than ⅛ inch) must be made between the reader antenna and the surgical tool or implant device in order to read the RFID tag. Again, this "virtual" contact requirement makes communication with a surgical implant or a full set of surgical tools within the enclosure impossible without removal of the contents of the enclosure.

What is needed in the art is an RFID transponder used with surgical instruments or implants that can be communicated with from a greater distance.

SUMMARY OF THE INVENTION

The present invention provides an RFID tag which is inductively coupled and impedance matched with a metallic implement, using the metallic implement as an antenna and increasing the read/write distance between the RFID reader and RFID tagged implement.

The invention in one form is directed to an RFID tagged implement assembly, including a metallic implement, and a wireless RFID transponder. The RFID transponder includes a housing; an inductive coupler within the housing, and an RFID chip coupled with the inductive coupler. The inductive coupler is inductively coupled with the metallic implement.

An advantage of the present invention is that the read/write distance between the reader and the RFID transponder is increased.

Another advantage is that the increased read/write distance allows better utilization in the field.

Still another advantage is the ability of the RFID transponder to be utilized with a wide variety of metallic materials, shapes and sizes and is reusable through decontamination and sterilization processes.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 2:
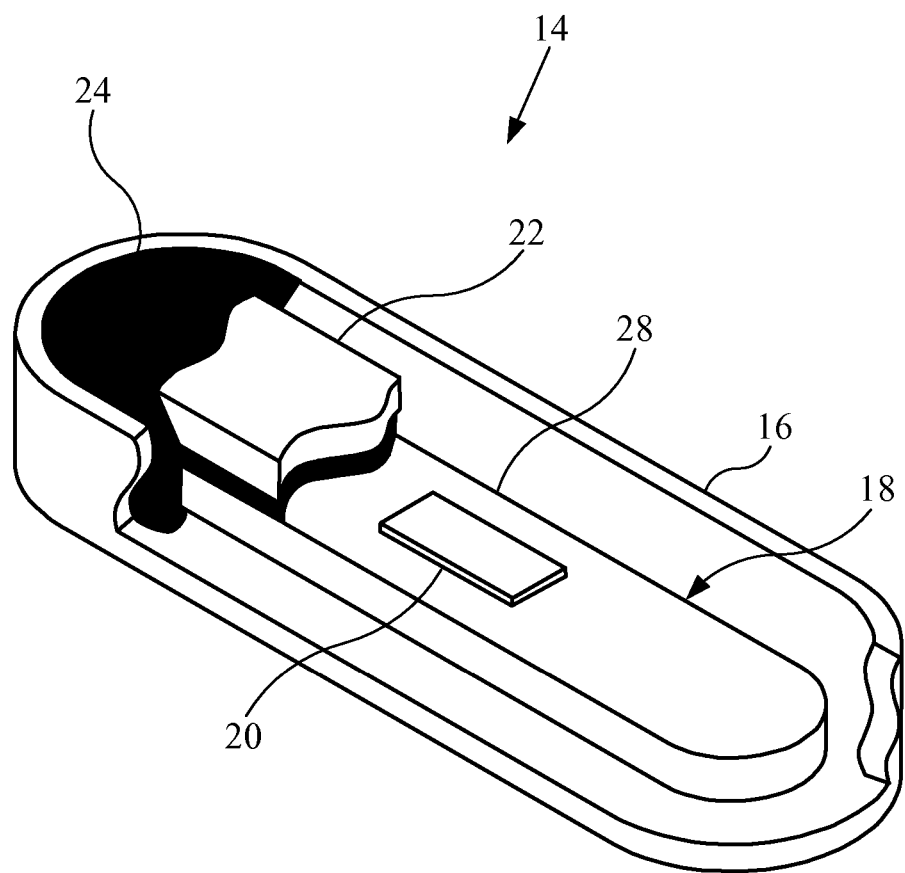
FIG. 2 is a fragmentary, perspective view of one embodiment of an RFID transponder of the present invention.
Figure 3:
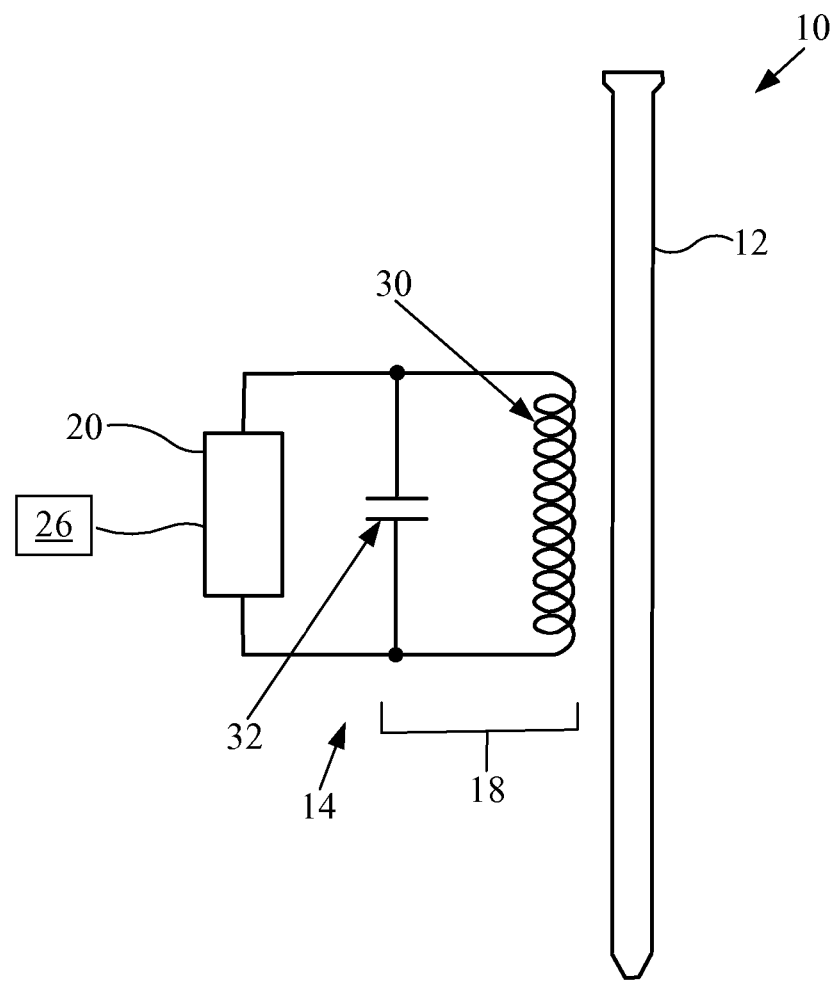
FIG. 3 is an electrical schematic of the RFID transponder shown in FIG. 2.

Referring now to the drawings, and more particularly to FIGS. 2 and 3, there is shown an embodiment of an RFID tagged implement assembly 10 of the present invention, including a metallic implement 12 and an RFID transponder 14 which is coupled with implement 12 and uses implement 12 as an antenna for wireless communications. In the embodiment shown, metallic implement 12 is in the form of an surgical implement such as an orthopaedic implant or surgical instrument, but could be in form of a different type of metallic implement in which it is desirable to affix an RFID transponders. It will be appreciated that dependent upon the type of metallic implement 12, the impedance characteristics will vary as a function of the material type and geometry of the implement.

RFID transponder 14 generally includes a housing 16, inductive coupler 18 (outside of substrate 28), RFID chip 20, gamma shield 22 and potting material 24.

Housing 16 may be of any suitable plastic or other non-metallic material, depending upon the application. In the embodiment shown, housing 16 is a polyphenylsulfone potting cup.

Alternatively, housing 16 may be in the form of a plastic material such as a high dielectric polymer that is overmolded, encasing RFID chip 20, inductive coupler 18 and gamma shield 22. The plastic material also preferably is hydroscopic (such as polyphenylsulfone) such that bacteria cannot become trapped in the small molecular recesses of non-hydroscopic material. The inductive coupler 18 is spaced away from the periphery of RFID transponder 14 such that the dielectric encapsulation material 24 and the bottom of the plastic enclosure 16 forms the capacitive link between the coupling circuit and the longitudinal axis (longest dimension) of the metallic implement, such as a surgical tool or orthopaedic implant.

Inductive coupler 18 generally includes a high dielectric substrate 28 (FIG. 2) carrying a conductor 30 opposite side from RFID chip for inductively coupling with implement 12. The term "high dielectric" as used herein is intended to mean any dielectric with a dielectric constant of greater than 3. Substrate 28 is preferably a teflon/ceramic, such as Arlon AD1000™ or equivalent. Inductive coupler 18 is positioned immediately adjacent metallic implement 12.

In FIG. 3, the parasitic capacitance of substrate 28 is shown at reference number 32. The parasitic capacitance of substrate 28 may be selectively varied by the material type and thickness of substrate 28, in turn varying the inductive coupling efficiency and impedance between conductor 30 and metallic implement 12. Alternatively, and/or additionally, a discrete electrical component in the form of a variable capacitor at reference number 32 may be utilized. In the event a variable capacitor is used, an adjustment knob, dial, slot, etc. is accessible at the exterior of housing 16 to facilitate "adjustment" of the inductive coupling to compensate for variations in the length, width, depth and permeability/Q of metallic implement 12.

Conductor 30 (shown schematically as an inductive coil in FIG. 3, and not specifically shown in FIG. 2) may be configured with desired impedance characteristics to provide a substantial impedance match with metallic implement 12. This primarily is a function of the material type, cross sectional area and length of conductor 30. In the embodiment shown, conductor 30 is in the form of a micro-stripline copper trace which is carried by substrate 28. The length of conductor 30 generally corresponds to the length of substrate 28, and the impedance of conductor 30 can be varied by varying the length of substrate 28.

RFID chip 20 is electrically in parallel with conductor 30 and preferably is an off-the-shelf RFID chip with an input/output impedance of approximately 50 ohms. In this preferred embodiment RFID chip 20 is an Impinj Monza 2™.

Gamma shield 22 is comprised of the same high dielectric material as substrate 28 with a solid copper outer layer constructed to substantially shield against gamma radiation, improves the RF impedance characteristics, and preferably is a copper shield which is sized similar to substrate 28. RFID chip 20 is sandwiched between gamma shield 22 and substrate 28. The various electrical components, including gamma shield 22, RFID chip 20 and inductive coupler 18, are potted within housing 16 using a suitable potting material 24. In the case that metallic implement 12 is an orthopaedic implant or instrument, potting material 24 is preferably a medical grade epoxy sealant.

Figure 1:
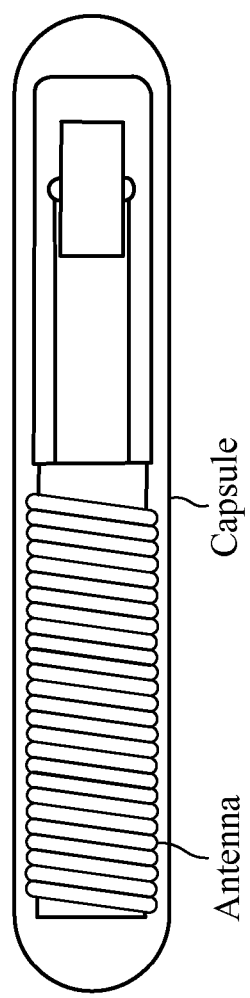
FIG. 1 is a side, sectional view of a known implantable capsule housing an RFID tag.
Figure 4:
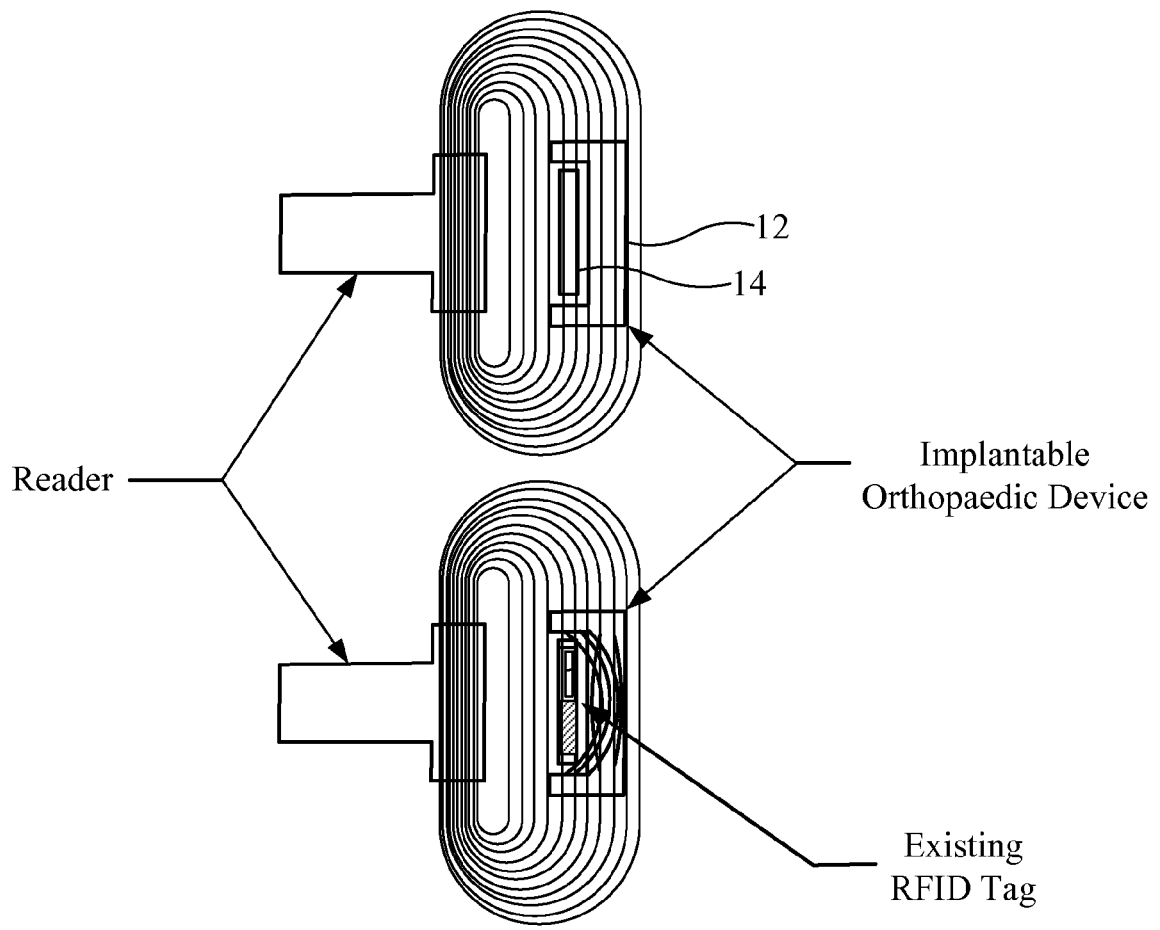
FIG. 4 is a graphical illustration comparing the magnetic fields present with the known RFID tag of FIG. 1 and the RFID transponder of the present invention shown in FIGS. 2 and 3.

FIG. 4 is a graphical illustration comparing the magnetic fields present with the known RFID tag of FIG. 1 and the RFID transponder of the present invention shown in FIGS. 2 and 3. As shown, the magnetic field lines of a conventional RFID capsule bend around the capsule as a result of the metallic composition of the metallic implement, whereas the magnetic field lines using the RFID tagged implement assembly of the present invention are in a relatively straight line through the RFID coupler and metallic implement.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A wireless RFID transponder, comprising:
   a non-metallic housing attachable directly to a metallic implement to be RFID tagged, the metallic implement being separate and discrete from the wireless RFID transponder, the metallic implement having a metallic body and an absence of an antenna;
   an RFID chip within said housing, said RFID chip being mechanically connected to said housing; and
   an inductive coupler within said housing and electrically connected with said RFID chip, said inductive coupler being impedance matched to the metallic implement to inductively couple with the metallic implement external and immediately adjacent to said housing and thereby effectively utilizing the metallic implement as an antenna for said RFID chip so that the RFID transponder can wirelessly communicate information with an RFID reader.

2. The wireless RFID transponder of claim 1, wherein said inductive coupler comprises a stripline coupler.

3. The wireless RFID transponder of claim 2, wherein said stripline coupler comprises a micro-stripline coupler.

4. The wireless RFID transponder of claim 2, wherein said stripline coupler includes a high dielectric substrate and at least one trace carried by said substrate, said substrate having a predetermined thickness and material type to effect said inductive coupling between said wireless RFID transponder and the metallic structure.

5. The wireless RFID transponder of claim 1, including a shield, said RFID chip being positioned between said inductive coupler and said shield.

6. The wireless RFID transponder of claim 5, wherein said shield is a gamma shield.

7. The wireless RFID transponder of claim 6, wherein said housing is a polyphenylsulfone potting cup.

8. The wireless RFID transponder of claim 7, including a potting material within said housing.

9. The wireless RFID transponder of claim 8, wherein said potting material is a medical grade epoxy sealant.

10. The wireless RFID transponder of claim 1, including a memory coupled with said RFID chip.

11. The wireless RFID transponder of claim 1, wherein said inductive coupler includes an adjustable capacitance.

12. The wireless RFID transponder of claim 11, wherein said inductive coupler includes a high dielectric substrate, and said adjustable capacitance includes at least one of:
   a selectability of at least one of a physical size and physical property of said coupler substrate; and
   an adjustable capacitor.

13. An RFID tagged implement assembly, comprising:
   a metallic implement to be RFID tagged, said metallic implement having a metallic body and an absence of an antenna; and
   a wireless RFID transponder separate and discrete from said metallic implement, including:
      a non-metallic housing attached immediately adjacent to said metallic implement;
      an RFID chip within said housing, said RFID chip being mechanically connected to said housing; and
      an inductive coupler within said housing and coupled with said RFID chip, said inductive coupler inductively coupled and impedance matched with said metallic implement and thereby effectively utilizing said metallic implement as an antenna for said RFID chip so that said RFID transponder can wirelessly communicate information with an RFID reader.

14. The RFID tagged implement assembly of claim 13, wherein said metallic implement comprises a surgical implement.

15. The RFID tagged implement assembly of claim 14, wherein said surgical implement comprises one of an orthopaedic implant and instrument.

16. The RFID tagged implement assembly of claim 13, wherein said metallic implement includes a recess, and said RFID transponder is disposed in said recess.

17. The RFID tagged implement assembly of claim 13, wherein said inductive coupler comprises a stripline coupler.

18. The RFID tagged implement assembly of claim 17, wherein said stripline coupler includes a high dielectric substrate and at least one trace carried by said substrate, said substrate having a predetermined thickness and material type to effect said inductive coupling between said wireless RFID transponder and said metallic implement.

19. The RFID tagged implement assembly of claim 13, including a gamma shield, said RFID chip being positioned between said inductive coupler and said shield.

20. The RFID tagged implement assembly of claim 13, including an epoxy sealant potting material within said housing.

21. The RFID tagged implement assembly of claim 13, wherein said inductive coupler includes an adjustable capacitance.

* * * * *